US010970706B2

United States Patent
Quentin

(10) Patent No.: US 10,970,706 B2
(45) Date of Patent: Apr. 6, 2021

(54) METHOD FOR PROCESSING A TRANSACTION FROM A COMMUNICATIONS TERMINAL

(71) Applicant: INGENICO GROUP, Paris (FR)

(72) Inventor: Pierre Quentin, Enghien des Bains (FR)

(73) Assignee: INGENICO GROUP, Paris (FR)

( * ) Notice: Subject to any disclaimer, the term of this patent is extended or adjusted under 35 U.S.C. 154(b) by 251 days.

(21) Appl. No.: 15/542,437

(22) PCT Filed: Jan. 8, 2016

(86) PCT No.: PCT/EP2016/050318
§ 371 (c)(1),
(2) Date: Jul. 9, 2017

(87) PCT Pub. No.: WO2016/110590
PCT Pub. Date: Jul. 14, 2016

(65) Prior Publication Data
US 2017/0357960 A1    Dec. 14, 2017

(30) Foreign Application Priority Data

Jan. 9, 2015 (FR) ...................................... 1550191
Jan. 9, 2015 (FR) ...................................... 1550192
(Continued)

(51) Int. Cl.
*G06Q 20/32* (2012.01)
*G06Q 20/40* (2012.01)
(Continued)

(52) U.S. Cl.
CPC ......... *G06Q 20/3227* (2013.01); *G06F 21/53* (2013.01); *G06Q 20/02* (2013.01);
(Continued)

(58) Field of Classification Search
None
See application file for complete search history.

(56) References Cited

U.S. PATENT DOCUMENTS 7,434,723 B1    10/2008  White et al.
2003/0145205 A1    7/2003  Sarcanin
(Continued)

FOREIGN PATENT DOCUMENTS

DE    102011109318 A1    2/2013
EP    2157540 A1    2/2010
(Continued)

OTHER PUBLICATIONS

International Search Report dated Mar. 10, 2016 for corresponding International Application No. PCT/EP2016/050316, filed Jan. 8, 2016.
(Continued)

*Primary Examiner* — Jamie R Kucab
(74) *Attorney, Agent, or Firm* — David D. Brush; Westman, Champlin & Koehler, P.A.

(57) ABSTRACT

A secure element integrated within a mobile communications terminal. Such an element includes: at least one first application for processing transactions, having at least one interface for communications with a communications network in a secured manner; and at least one second application for processing secured data, having at least one communications interface for communications with an executing environment of said communications terminal. The first application is able to request at least one piece of data from the second application.

7 Claims, 2 Drawing Sheets

(30) Foreign Application Priority Data

Figure 1:
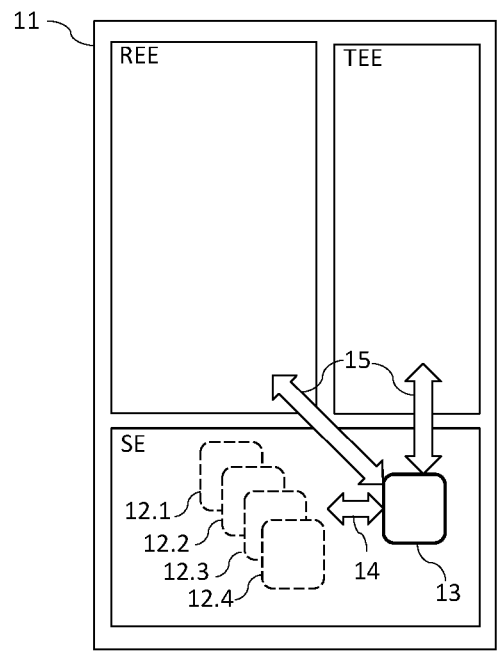

| Jan. 9, 2015 | (FR) | 1550193 |
|---|---|---|
| Feb. 13, 2015 | (FR) | 1551241 |

(51) Int. Cl.

| G06F 21/53 | (2013.01) |
|---|---|
| H04L 29/06 | (2006.01) |
| G06Q 20/42 | (2012.01) |
| H04W 12/08 | (2021.01) |
| G06Q 20/02 | (2012.01) |
| G06Q 20/34 | (2012.01) |
| H04W 12/12 | (2021.01) |
| G06Q 20/22 | (2012.01) |
| H04L 9/32 | (2006.01) |
| H04L 29/08 | (2006.01) |
| H04W 12/00 | (2021.01) |

(52) U.S. Cl.
CPC ....... *G06Q 20/2295* (2020.05); *G06Q 20/351* (2013.01); *G06Q 20/40* (2013.01); *G06Q 20/401* (2013.01); *G06Q 20/405* (2013.01); *G06Q 20/4012* (2013.01); *G06Q 20/40145* (2013.01); *G06Q 20/40975* (2013.01); *G06Q 20/42* (2013.01); *H04L 9/3226* (2013.01); *H04L 63/0428* (2013.01); *H04L 63/10* (2013.01); *H04L 63/101* (2013.01); *H04L 67/16* (2013.01); *H04W 12/08* (2013.01); *H04W 12/12* (2013.01); *G06Q 2220/00* (2013.01); *H04L 67/34* (2013.01); *H04L 67/42* (2013.01); *H04W 12/00407* (2019.01)

(56) References Cited

U.S. PATENT DOCUMENTS

| 2007/0078760 | A1 | 4/2007 | Conaty et al. | |
|---|---|---|---|---|
| 2008/0320597 | A1 | 12/2008 | Hochfield | |
| 2009/0294526 | A1 | 12/2009 | Maw | |
| 2010/0114733 | A1 | 5/2010 | Collas et al. | |
| 2010/0145850 | A1 | 6/2010 | Nagai et al. | |
| 2011/0078081 | A1* | 3/2011 | Pirzadeh | G06Q 20/20 705/44 |
| 2011/0238569 | A1 | 9/2011 | Kim et al. | |
| 2012/0069772 | A1 | 3/2012 | Byrne et al. | |
| 2012/0123883 | A1 | 5/2012 | Charrat | |
| 2013/0221092 | A1 | 8/2013 | Kushevsky et al. | |
| 2013/0301830 | A1 | 11/2013 | Bar-El et al. | |
| 2014/0066015 | A1 | 3/2014 | Aissi | |
| 2014/0074655 | A1 | 3/2014 | Lim et al. | |
| 2014/0074714 | A1 | 3/2014 | Melone et al. | |
| 2014/0287683 | A1 | 9/2014 | Rankl et al. | |
| 2014/0317686 | A1* | 10/2014 | Vetillard | G06F 21/74 726/2 |
| 2015/0004934 | A1 | 1/2015 | Qian et al. | |
| 2015/0007335 | A1* | 1/2015 | Buer | G06F 21/74 726/26 |
| 2015/0120472 | A1 | 4/2015 | Aabye et al. | |
| 2015/0181410 | A1* | 6/2015 | Liu | H04W 4/60 455/419 |
| 2015/0378581 | A1* | 12/2015 | Dietz | G06F 3/0488 715/769 |
| 2016/0063480 | A1 | 3/2016 | Ballesteros et al. | |
| 2017/0142090 | A1 | 5/2017 | Mahaffey et al. | |
| 2017/0251369 | A1* | 8/2017 | Alberti | H04W 12/08 |

FOREIGN PATENT DOCUMENTS

| EP | 2455922 A1 | 5/2012 |
|---|---|---|
| EP | 2746981 A1 | 6/2014 |
| WO | 2004072914 A1 | 8/2004 |
| WO | 2012154915 A1 | 11/2012 |
| WO | 2013078499 A1 | 6/2013 |
| WO | 2013117061 A1 | 8/2013 |

OTHER PUBLICATIONS

Written Opinion of the International Searching Authority dated Mar. 10, 2016 for corresponding International Application No. PCT/EP2016/050316, filed Jan. 8, 2016.
English translation of the Written Opinion of the International Searching Authority dated Jun. 1, 2017 for corresponding International Application No. PCT/EP2016/050317, filed Jan. 8, 2016.
English translation of the Written Opinion of the International Searching Authority dated May 29, 2017 for corresponding International Application No. PCT/EP2016/050316, filed Jan. 8, 2016.
International Search Report dated Mar. 10, 2016 for corresponding International Application No. PCT/EP2016/050317, filed Jan. 8, 2016.
Written Opinion of the International Searching Authority dated Jul. 14, 2016 for corresponding International Application No. PCT/EP2016/050317, filed Jan. 8, 2016.
English translation of the Written Opinion of the International Searching Authority dated May 29, 2017 for corresponding International Application No. PCT/EP2016/050318, filed Jan. 8, 2016.
"EMV Mobile Contactless Payment: Technical Issues and Positions Paper", Internet Citation, Oct. 1, 2007 (Oct. 1, 2007), pp. 1-37, XP007908266.
International Search Report dated Mar. 10, 2016 for corresponding International Application No. PCT/EP2016/050318, filed Jan. 8, 2016.
Written Opinion of the International Searching Authority dated Mar. 10, 2016 for corresponding International Application No. PCT/EP2016/050318, filed Jan. 8, 2016.
Notice of Allowance dated Mar. 20, 2019 for related U.S. Appl. No. 15/542,436, filed Jul. 9, 2017.
Office Action dated Nov. 29, 2018 from the United States Patent and Trademark Office for corresponding U.S. Appl. No. 15/542,436, filed Jul. 9, 2017.
Notice of Allowance dated Jul. 1, 2019 from the USPTO for corresponding U.S. Appl. No. 15/542,436, filed Jul. 9, 2017.
Corrected Notice of Allowability dated Aug. 14, 2019 from the USPTO for corresponding U.S. Appl. No. 15/542,436, filed Jul. 9, 2017.
Notice of Allowance dated Sep. 9, 2019 from the USPTO for corresponding U.S. Appl. No. 15/542,436, filed Jul. 9, 2017.
Office Action dated Jun. 28, 2019 for corresponding U.S. Appl. No. 15/542,591, filed Jul. 10, 2019.
"EMV Integrated Circuit Card Specifications for Payment Systems", Book 3, Application Specification, Version 4.3, Nov. 2011.
Final Office Action dated Jan. 2, 2020 from the USPTO for corresponding U.S. Appl. No. 15/542,591, filed Jul. 10, 2017.
Office Action dated Aug. 24, 2020 from the USPTO for corresponding U.S. Appl. No. 15/542,591, filed Jul. 10, 2017.
Final Office Action dated Feb. 11, 2021 for corresponding U.S. Appl. No. 15/542,591, filed Jul. 10, 2017.

\* cited by examiner

METHOD FOR PROCESSING A TRANSACTION FROM A COMMUNICATIONS TERMINAL

CROSS-REFERENCE TO RELATED APPLICATIONS

This Application is a Section 371 National Stage Application of International Application No. PCT/EP2016/050318, filed Jan. 8, 2016, which is incorporated by reference in its entirety and published as WO 2016/110590 A1 on Jul. 14, 2016, not in English.

FIELD OF THE INVENTION

The proposed technique relates to the online processing of transactions, and more particularly to the processing of transactions using a communications terminal in a secured manner.

PRIOR ART

There are two modes of transactions that co-exist when a user wishes to carry out a payment transaction using a bank card:
  The "card present" mode: the bank card is physically used. It is for example inserted into a payment terminal and the information that it contains is read directly from the chip or the magnetic stripe integrated into the card. As an alternative, the bank card is brought close to a payment terminal and the information is transmitted via an NFC (Near Field Communication) type of contactless technology;
  The "card not present" mode: the bank card is not used physically but the user enters the information present on this card (card number, visual cryptogram, expiry date, bearer's name) to make a transaction. This is the solution that is predominantly used today for online payment on the Internet for example.
  Many manufacturers of mobile communications terminals (typically smartphones and tablets) are seeking today to develop payment solution directly integrated with the mobile terminal, enabling the user to avert with the need to use his bank card when he wishes to make a transaction.
  The solutions currently proposed for this purpose rely essentially on an implementation based on the "card not present" type of transaction mode, described here above: in a first phase of initializing the service, the user is asked to enter the information associated with his bank card or bank cards (for example the type of card, the card number, the visual cryptogram, the expiry date etc.) in a dedicated application installed in his communications terminal. This information is then recorded in the communications terminal itself. When this initialization phase is completed, the user can use the dedicated application to make certain payments without needing to carry his bank card with him and without having to manually re-enter the information indicated on his bank card: this information is directly transmitted by the communications terminal to the payment server.
  This solution however is limited. On the one hand, the possibilities of transactions accessible from mobile communications terminal are limited and relate only to online transactions relying on a "card not present" mode, and the proposed solution is then aimed essentially at avoiding the need for the user himself to enter the data associated with his bank card whenever he wishes to make a payment from a communications terminal (an often tedious entry procedure).

Moreover, this approach raises security-related problems: since all the data needed to make a transaction is stored within the communications terminal itself, a user who has mislaid his mobile device (his cell phone for example) or had it stolen from him will not be safe from a malicious person who has retrieved his property and then accesses sensitive information and makes financial transactions in his name (if the communications terminal or application containing this information is insufficiently secured for example).

This problem of securing which arises when making payment transactions from a communications terminal is also encountered when making transactions of other types: if authorization is required to make a transaction from a communications terminal, it is risky to store information enabling access to such authorization within this very communications terminal.

There is therefore a need for a solution to integrate means for obtaining authorizing for transactions within a communications terminal, without incurring at least some of these prior-art problems.

SUMMARY OF THE INVENTION

The proposed technique does not comprise these drawbacks of the prior art.

More particularly, the proposed technique relates to a secure element (SE) integrated within a mobile communications terminal.

Such an element comprises:
  at least one first application for processing transactions, comprising at least one communications interface for communications with a communications network in a secured manner, and
  at least one second application for processing secured data, comprising at least one communications interface for communications with an executing environment of said communications terminal, said first application being able to request at least one piece of data from said second application.

Thus, such a secure element enables a communications terminal to offer both a transaction-processing function and "extended" functions matching the data-processing capacities of the payment terminal. Besides, such an element makes it possible to avoid the need for certification for each type of terminal within which it could be inserted.

According to one particular characteristic, said second application comprises at least one secured storage space.

Thus, the second application is capable of managing the storage of data by itself. According to one particular characteristic, said second application comprises at least one list of identifiers of applications authorized to access said at least one piece of data.

Thus, the application can permit or reject access to data in a controlled manner. Complementarily, this list can be pre-defined and non-modifiable in order to limit access.

According to one particular characteristic, said second application comprises at least one list of identifiers of applications authorized to request the storage of data within said secured storage space.

According to one particular characteristic, said at least one piece of data belongs to the group comprising:
  a piece of data representing a payment card;
  a piece of data representing an association between a merchant identifier on the one hand and an identifier of the user with said merchant on the other hand;
  a piece of biometric identification or authentication data.

Another embodiment also proposes a method of communications between a first application for processing transactions and a second application for processing secured data, said applications being executed within a secure element of a communications terminal.

Such a method comprises:
- a step of reception, by said first application, of a request coming from a communications network;
- a step of transmission, by said first application, of a request for obtaining a piece of secured data, addressed to said second application;
- a step for the obtaining, by said second application, of said piece of data requested by the first application;
- a step of transmission, by said second application, of said piece of requested data, to said first application;
- a step of transmission, by said first application, of said piece of requested data, to said communications network.

According to one particular characteristic, prior to said step for the obtaining, by said second application, of said piece of data requested by the first application, the method comprises a step of verification, by said second application, that said first application is truly authorized to access said piece of requested data.

According to one particular characteristic, said step for the obtaining, by said second application, of said piece of data requested by the first application, comprises the following sub-steps:
- transmitting a request for obtaining said piece of data addressed to an execution environment of said communications terminal;
- receiving said piece of data requested by the first application, coming from said execution environment of said communications terminal.

According to a preferred embodiment, the different steps of the methods according to the proposed technique are implemented by one or more software programs or computer programs comprising software instructions to be executed by a data processor of a relay module according to the proposed technique and designed to control the execution of different steps of the methods.

The proposed technique is therefore also aimed at providing a program capable of being executed by a computer or by a data processor, this program comprising instructions to command the execution of the steps of a method as mentioned here above.

This program can use any programming language whatsoever and be in the form of source code, object code or intermediate code between source code and object code such as in a partially compiled form or in any other desirable form whatsoever.

The proposed technique is also aimed at providing an information carrier readable by a data processor and comprising instructions of a program as mentioned here above.

The information carrier can be any entity or device whatsoever capable of storing the program. For example, the carrier can comprise a storage means such as a ROM, for example, a CD ROM or microelectronic circuit ROM or again a magnetic recording means, for example a floppy disk or a hard disk drive.

Furthermore, the information carrier can be a transmissible carrier such as an electrical or optical signal that can be conveyed via an electrical or optical cable, by radio or by other means. The program according to the proposed technique can especially be uploaded to an Internet type network.

As an alternative, the information carrier can be an integrated circuit into which the program is incorporated, the circuit being adapted to executing or to being used in the execution of the method in question.

According to one embodiment, the proposed technique is implemented by means of software and/or hardware components. In this respect, the term "module" can correspond in this document equally well to a software component and to a hardware component or to a set of hardware and software components.

A software component corresponds to one or more computer programs, one or more sub-programs of a program or more generally to any element of a program or a piece of software capable of implementing a function or a set of functions according to what is described here below for the component concerned. Such a software component is executed by a data processor of a physical entity (terminal, server, gateway, router etc) and is capable of accessing hardware resources of this physical entity (memories, recording media, communications buses, input/output electronic boards, user interfaces etc).

In the same way, a hardware component corresponds to any element of a hardware assembly capable of implementing a function or a set of functions according to what is described here below for the component concerned. It can be a programmable hardware component or a component with an integrated processor for the execution of software, for example, an integrated circuit, smart card, a memory card, an electronic board for the execution of firmware etc.

Each component of the system described here above can of course implement its own software components.

The different embodiments mentioned here above can be combined with one another to implement the proposed technique.

FIGURES

Figure 3:
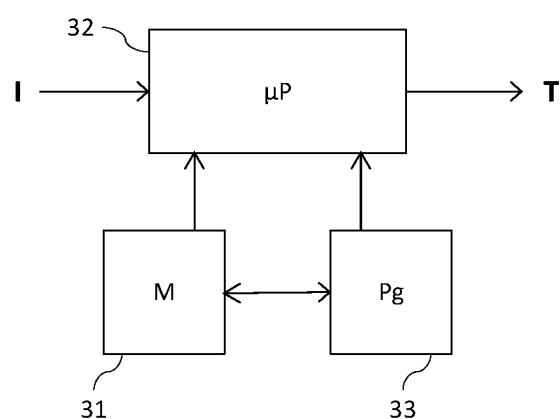
Figure 2:
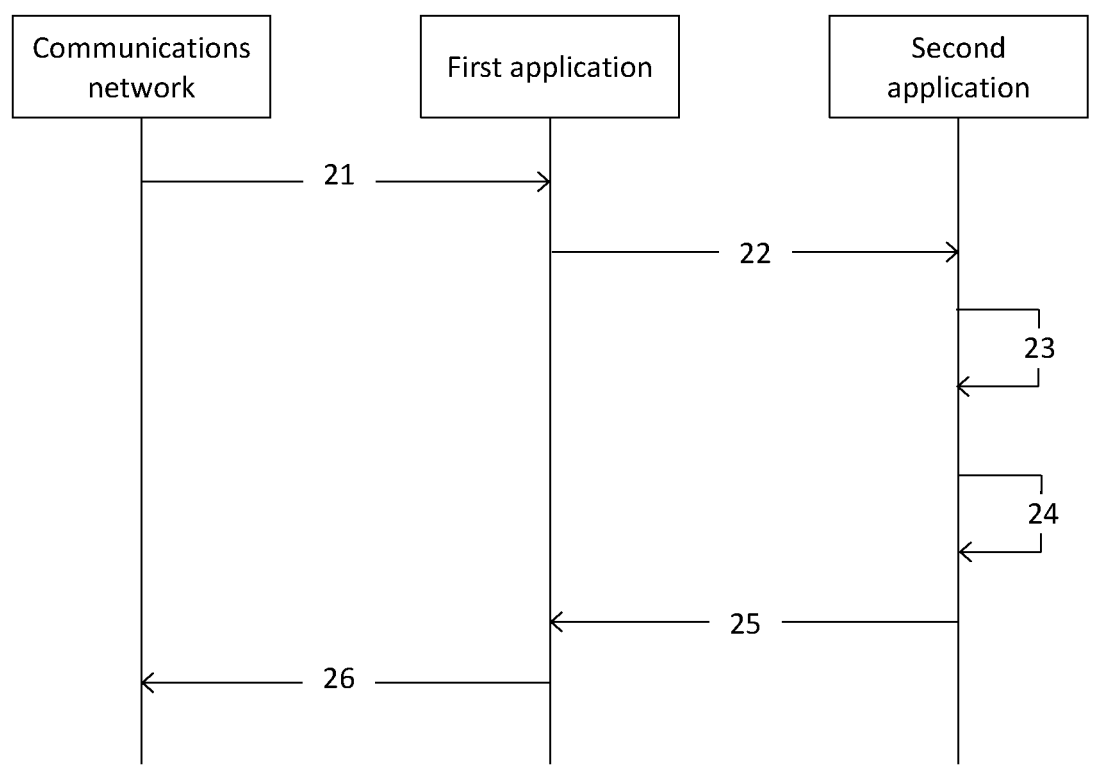

Other features and advantages of the invention shall appear more clearly from the following description of a preferred embodiment, given by way of a simple illustratory and non-exhaustive example and from the appended drawings, of which:

FIG. 1 describes a simplified architecture of a communications terminal capable of being used in the context of the implementation of the proposed technique, according to one particular embodiment;

FIG. 2 illustrates the steps carried out for implementing a method of communication between a first application for processing transactions and a second application for processing secured data, in one particular embodiment;

FIG. 3 describes a simplified architecture of a secure element according to one particular embodiment of the proposed technique.

DESCRIPTION

General Principle

The proposed technique does not have at least some of these problems of the prior art. Indeed, the invention herein proposes a method for processing a transaction made online, that relies on the use of a communications terminal to obtain an authorization to carry out said transaction. This communications terminal has hardware and software means to ensure increased securing of the transaction. In particular, it comprises a secure element within which there is executed a first application in charge of processing the transaction on the terminal side. According to the proposed technique, a second application is also executed within this secure element. The role of this second application is to support the first application by providing it, on it request, the data needed to continue or enrich the transaction being processed.

In the proposed technique, the same authentication mechanisms as those implemented in the context of carrying out payment transactions using a bank card in the "card present" mode are implemented within the communications terminal in order to obtain authorization to carry out a transaction using said communications terminal. A communications terminal however does not have the same limitations as a smart card in terms of resources (especially in terms of memory). Thus, the use of a communications terminal enables the resources proper to such a device to be advantageously used in order to contribute to the implementing of the transaction. In particular, the general principle of the proposed technique provides the application for processing transactions implemented at the communications terminal—which is an application similar to the one executed within a payment card—with the means for obtaining complementary information available within the communications terminal. These means take the form of a second application, capable of communicating with said first processing application, to provide it with this complementary information, which can be either data needed to continue the transaction (for example biometric data to ensure increased security of the transaction) or else data necessary for implementing complementary services related to the present transaction (for example crediting fidelity points).

FIG. 1 presents a simplified architecture of a communications terminal (11) capable of being used in the context of the implementation of the proposed technique, in one particular embodiment. Such a communications terminal (11) comprises a secured processor having access to a secured memory. This secured processor and this secured memory are, if necessary, distinct from the central processor and the central memory which govern the day-to-day functioning (taking calls, sending messages, internet browsing, executing daily applications etc.) of the communications terminal and implement a rich execution environment (REE) of the operating system installed in the communications terminal. This secured processor and secured memory (which therefore form a secured space within the communications terminal) can for example be integrated into a trusted execution environment (TEE) that is delivered to the manufacturer of communications terminals. These trusted execution environment (TEE) can furthermore be complemented by a securing module or secure element (SE), the function of which in the context of the present technique is to dialog with a virtual payment terminal. A secure element (SE) takes the form of a hardware platform resistant to attacks, within which it is possible to execute secured applications. Such a secure element offers especially a securing level greater than that procured by the trusted execution environment (TEE) inasmuch as it is designed to provide protection against not only software attacks but also hardware attacks (a trusted execution environment or TEE being designed more particularly to offer protection against software attacks but not necessarily against hardware attacks). Several types of services (12) that require an authorization to be obtained, for the purpose of carrying out associated transactions, are pre-defined within this secure element (SE) (for example in the form of specific applications, also called applets). In order to enable a user to carry out payment transactions, the secure element (SE) integrates for example pre-determined types of payment services corresponding to the different, most wide-spread payment services. By way of illustrations that are not exhaustive, we may cite Visa® and MasterCard® payment services. Other types of services can also be pre-defined (FIG. 1 provides by way of an example a secure element (SE) within which four types of services 12.1 to 12.4 are defined but this example is purely illustrative: a secure element according to the proposed technique integrates at least one type of service). Each type of service predefined within a secure element is associated with a unique identifier (PAN_S) built in the same format as a bank card number (or PAN or Primary Account Number), i.e. according to the ISO/IEC 7812 standard entitled "Identification Cards—Identification of Issuers"). Each of these identifiers is unique not only within a same secure element but also unique within the set of commercially distributed secure elements. Thus, such a secure element provided to a manufacturer of communications terminals contains, for each type of service pre-defined therein, an identifier that acts as a unique, non-degradable signature built in the same format as a bank card number (with four groups of four digits). Within this secure element, each type of service is stored in the same form as the data contained in a bank card type of memory card (a type of service that then behaves towards the exterior as a virtual bank card with its own number (PAN_S).

As described here above, the different types of services used to carry out associated transactions can take the form of specific applications, also called applets, that are executed within the securing element (SE) of the communications terminal. Thus, the different types of services 12.1 to 12.4 presented in FIG. 1 can be likened to an equivalent number of transaction-processing applets (12), capable of processing secured data according to the same mechanism as those implemented in the context of a payment transaction made with a bank card in "card present" mode in association with a payment terminal. In order to ensure maximum securing when a transaction is in progress, the associated applet that is executed within the secure element (transaction-processing applet (12)) does not have the possibility of exchanging information with components of the communications terminal that might be situated outside the secure element (SE). Thus an operation identical to that of a bank card (which can exchange information only with a payment terminal during a transaction) is ensured. However, it can prove to be necessary or useful for the transaction-processing applet (12), during the process of making a transaction, to have access a certain number of information elements present outside the secure element (SE) of the communications terminal. For example, if the user who wishes to make a payment transaction has provisioned several bank cards in his communications terminal, it is necessary for the secure element (SE) to be capable of selecting the payment card that the user wishes to use. The different representations of the cards at the disposal of a user (for example images, photos or again the last four digits of the cards in question) are not necessarily stored within the secure element (SE) of the communications terminal (of which the quantity of memory is not as great). Thus, the transaction-processing applet (12) must have the possibility of accessing external information, for example information contained in the rich execution environment (REE) or in the trusted execution environment (TEE) of the communications terminal. It must also have the possibility of accessing information stored within the secure element (SE) of the communications terminal but which it does not control directly.

According to the technique proposed herein to meet this problem, when a transaction is being processed, a complementary applet (13) can be executed within the secure element (SE), in parallel with the execution of the transaction-processing applet (12). The transaction-processing applet (12) is capable of dialoging (14) with this complementary applet (13) inasmuch as both are executed within the secure element (SE). In practice, this exchange of data can be done by means of dedicated software interfaces. By way of an illustration, an execution environment such as the one proposed by Java Card®, commonly used to implement applications on smart cards, defines the modality of interaction among the applets that are executed within it and especially provides means, under the name "shareable Interface", enabling inter-applet data exchanges. In this solution, the applet that makes the data available by means of a dedicated interface is capable of authorizing or not authorizing another applet to access it, on the basis of a control of its application identifier (AID). The objects thus exchanged between the transaction-processing applet and the complementary applet can especially take the form of APDU (Application Data Protocol Unit) messages, i.e. messages compliant with the communications protocol used for the exchange of data between a smart card and a smart-card reader. The complementary applet (13), which is not subjected to the same securing and real-time execution constraints as the transaction-processing applet, can also exchange data (15) with elements of the communications terminal external to the secure element, for example the rich execution environment (REE) of the communications terminal or again the trusted execution environment (TEE). Thus, the complementary applet (13) is capable of retrieving any piece of useful data needed for the continuance of a transaction and of communicating this data to the transaction-processing applet (12).

The complementary applet (13) can also play other roles in addition to that of being the link between the transaction-processing applet (12) and elements external to the communications module. It can for example contain information representing cards provisioned for a given type of service (for example an index used to distinguish between several cards of a same category), or again additional securing information such as biometric data on the user. As an illustration, many communications terminals are now equipped with sensors capable of detecting and analyzing fingerprints. In one possible use of the proposed technique, the user who has such a communications terminal can—for example when he decides to activate one of the types of services pre-defined in his communications terminal (in what is known as a provisioning phase)—choose a reinforced securing of the transactions, based on verification of a fingerprint. If he chooses this option, the user is then asked to follow a procedure for capturing a reference fingerprint by means of a dedicated sensor. This operation enables the delivery of a characteristic signature of this fingerprint, a signature that is then stored within the complementary applet or elsewhere in the communications terminal, for example within the trusted execution environment (TEE). During the subsequent implementing of a transaction, the transaction-processing applet can then prompt the complementary applet which takes charge of retrieving said signature associated with the reference fingerprint. The complementary applet has means at its disposal for exchanging information with the other execution environments of the communications terminal, external to the secure element (especially the rich execution environment (REE) and the trusted execution environment (TEE)), enabling it to access this signature of the reference fingerprint even if it is not stored within it. In this context, the complementary applet is used to obtain a piece of data needed to make an evaluation of whether the transaction can be authorized or not: when a user wishes to make a transaction, he must use the fingerprint sensor of his communications terminal to furnish a current fingerprint also characterized by a signature. The signature associated with the reference fingerprint and the signature associated with the current fingerprint are then transmitted in encrypted form to the transaction-processing server which takes charge of comparing them. This secured mechanism can advantageously replace or supplement an entry by the user of a personal identification number (also called a PIN Code).

In another example of use, the complementary applet is used to obtain data on the implementing of a fidelity program proposed by a merchant site, at the time when a payment transaction is made with this merchant site. For example, the complementary applet is used to obtain a user's identifier (usrId) from a merchant's site according to an identifier of said merchant (retid). An association between the merchant identifier (retid) and the identifier of the user (usrId) related to this merchant has been preliminarily stored in the communications terminal, for example at the time of the user's first purchase from this merchant or again when user joins a fidelity program proposed by the merchant, using the communications terminal.

Thus, when a merchant site makes a request to a transaction-processing server for the creation of a transaction linked to the validation of a basket of purchases by a user, it sends the transaction-processing server its merchant identifier (retId). The transaction-processing server then instantiates a virtual payment terminal (VPOI) capable of communicating with the communications terminal and also particularly with the transaction-processing applet of the secure element (SE), using APDU means. As an alternative, the merchant site can also instantiate the virtual payment terminal alone and request the setting up of a secured session with the communications terminal.

Be that as it may, the merchant identifier (retId) is thus transmitted to the transaction-processing applet which interrogates the complementary applet in order to determine whether the user has a customer account with this merchant. The complementary applet therefore—by means of a data structure that it hosts or is situated elsewhere in the communications terminal—verifies whether an input corresponding to this merchant identifier (retId) exists (the user has already made transactions with this merchant) and as the case may be retrieves the user's identifier from this merchant (usrId).

This user identifier (usrId) is communicated in return to the transaction-processing applet which transmits it in turn to the merchant. The merchant can then consult his own data structures to evaluate the situation of the associated user and the advantages, if any, to which he can lay claim (for example having points credited to a fidelity program, benefiting from an immediate reduction or a reduction on future purchase etc.). Should an immediate reduction be proposed (for example given because of the customer's fidelity), the merchant site communicates the new amount (amount after reduction) to the transaction-processing server which relays it to the user via the virtual payment terminal (VPOI). The reduction can thus be immediately transferred to the user.

According to the proposed technique, the complementary applet is therefore in charge of supporting at least one transaction-processing applet in order to give it, on it request and at the appropriate time, complementary data either necessary for the continuance of the transaction (for example biometric data) or useful to enrich the transaction (for example data on a fidelity program). This data can be stored right inside the complementary applet but also elsewhere within the communications terminal, for example outside the secure element or module (SE), in the rich execution environment (REE) or trusted execution environment (TEE) (the complementary applet then has means of communicating with applications executed within these execution environments). In one particular embodiment of the proposed technique, a same complementary applet can be used to provide complementary data to all the different transaction-processing applications that can be executed within the communications terminal. The complementary applet then integrates an authorization management mechanism enabling it to know whether transaction-processing applet is effectively entitled to access a requested piece of data (for example on the basis of an identifier (AID) of the requesting applet). As an alternative, several complementary applets can be executed within a same secure element, each being dedicated to supporting one or more other properly identified transaction-processing applets.

Associated Method

Referring to FIG. 2, and in one particular embodiment of the proposed technique, a description is provided of a method of communications between a first application for the processing of transactions and a second application for the processing of secured data, said applications being both executed within a same secure element of a communications terminal. Such a method is characterized in that it comprises:
a step (21) for the reception, by said first application, of a request coming from a communications network;
a step (22) for the transmission, by said first application, of a request for obtaining a piece of secured data, addressed to said second application;
a step (23) of verification, by said second application, that said first application is truly permitted to access said requested data;
Then, when said verification proves to be positive:
a step (24) for the obtaining, by the second application, of said piece of data requested by the first application;
a step (25) for the transmission, by said second application, of said requested data, addressed to said first application;
a step (26) for the transmission, by said first application, of said requested data, addressed to said communications network.

The step of verification (23) by the second application that the first application is truly authorized to access said requested data can be carried out by comparing an identifier (AID) of the first application (transmitted for example in the request for obtaining the secured data) with a list of identifiers of applications effectively permitted to access said data (list of identifiers stored within said second application).

As already presented in the cases of use explained here above, the data requested by the first application can be stored within a storage space (preferably secured) of the second application. As an alternative, it can be available within an execution environment of the communications terminal other than the secure element (for example within the rich execution environment (REE) or the trusted execution environment (TEE) of the communications terminal). In the latter case, the second application is capable of sending, in its turn, to some third party applications, executed within the appropriate execution environment, a request for obtaining the data requested by the first application. The data thus retrieved can then be for example temporarily stored within the storage space of the second application and then relayed to the first application. In this case, the second application can contain a list of identifiers of applications authorized to record data within its storage space.

Device

Referring to FIG. 3, a secure element of a communications terminal, comprising means for executing the method described here above, is described.

For example, the secure element comprises a memory 31 constituted by a buffer memory, a processing unit 32, equipped for example with a microprocessor and driven by the computer program 33, implementing functions necessary for implementing verification functions.

At initialization, the code instructions of the computer program 33 are for example loaded into a memory and then executed by the processor of the processing unit 32. The processing unit 32 inputs (I) for example a request asking for the processing of a transaction, coming from a communications network. The microprocessor of the processing unit 32 implements the steps of the method of communications between a first application for processing transactions and a second application for processing secured data, according to the instructions of the computer program 33 to enable the obtaining of a secured piece of data contributing to the processing of the transaction, and notifies the result of this processing operation at output (T).

To this end, the secure element comprises, in addition to the buffer memory 31, means of interfacing with a communications network and means of interfacing with other execution environments present within the communications terminal. The secure element also comprises cryptographic processing means; these processing means comprise for example a dedicated encryption processor and encryption keys such as session keys derived from an initial key.

These means can be managed by the processor of the processing unit 32 according to the computer program 33.

The invention claimed is:

1. A secure element integrated within a mobile communications terminal, the element comprising:
a processor; and
at least one non-transitory computer-readable medium comprising computer-implemented instructions executable by the processor, the instructions comprising:
at least one first application executed by the secure element for processing transactions, comprising at least one interface for communications with a communications network in a secured manner, the first application lacking a communication interface to exchange information with an executing environment of the mobile communications terminal outside of the secure element, and
at least one second application executed by the secure element for processing secured data while the first application processes a transaction, the at least one second application being distinct from the first application and comprising at least one communications interface for communications with the executing environment of said communications terminal that is outside of the secure element,
said first application being configured to request at least one piece of data from said second application of the secured element,
said second application comprising at least one list of identifiers of applications authorized to access said at least one piece of data, said second application being configured to:
verify that said first application is authorized to access said at least one piece of data, on the basis of said at least one list of identifiers of applications authorized to access said at least one piece of data;
in response to the first application being authorized to access said at least one piece of data, obtain said at least one piece of data; and
transmit the obtained at least one piece of data in a transmission addressed to the first application.

2. The secure element according to claim 1, wherein said second application comprises at least one secured storage space.

3. The secure element according to claim 2, wherein said second application comprises at least one list of identifiers of applications authorized to request storage of data within said secured storage space.

4. The secure element according to claim 1, wherein said at least one piece of data belongs to the group consisting of:
a piece of data representing a payment card;
a piece of data representing an association between a merchant identifier on the one hand and an identifier of the user with said merchant on the other hand;
a piece of biometric identification or authentication data.

5. A method of communications between a first application for processing transactions and a second application for processing secured data, said applications being executed within a secure element of a communications terminal, the method comprises:
receiving, by said first application of the secure element, a request coming from a communications network during a processing of a transaction by the first application through the communications network, the first application lacking a communication interface to exchange information with an executing environment of the communications terminal outside of the secure element;
transmitting, by said first application, a request for obtaining a piece of secured data, addressed to said second application of the secure element, which is distinct from the first application, wherein the second application processes secured data while the first application processes the transaction, the second application comprising at least one communications interface for communications with the executing environment of said communications terminal that is outside of the secure element;
verifying, by said second application, that said first application is authorized to access said piece of requested secure data, comprising verifying that an identifier of the first application is present in a list of identifiers of applications authorized to access said piece of requested secure data, said list of identifiers being stored within said second application;
in response to the first application being authorized to access said piece of requested secure data, obtaining, by said second application, said piece of requested secure data;
transmitting, by said second application, said piece of requested secure data, to said first application in a transmission addressed to the first application; and
transmitting, by said first application, said piece of requested secure data, to said communications network.

6. The method according to claim 5, wherein said obtaining, by said second application, of said piece of requested secure data comprises the following sub-acts:
transmitting a request for obtaining said piece of requested secure data addressed to the execution environment of said communications terminal outside of the secure element;
receiving said piece of requested secure data, coming from said execution environment of said communications terminal.

7. A non-transitory computer-readable medium comprising a computer program product stored thereon, which comprises program code instructions for executing a method of communications between a first application for processing transactions and a second application for processing secured data, when the instructions are executed by a processor of a secure element of a communications terminal, wherein said applications are executed within the secure element and wherein the instructions configure the secure element to:
receive, by said first application of the secure element, a request coming from a communications network during a processing of a transaction by the first application through the communications network, the first application lacking a communication interface to exchange information with an executing environment of the communications terminal outside of the secure element;
transmit, by said first application, a request for obtaining a piece of secured data, addressed to said second application of the secure element, which is distinct from the first application, wherein the second application processes secured data while the first application processes the transaction, the second application comprising at least one communications interface for communications with the executing environment of said communications terminal that is outside of the secure element;
verify, by said second application, that said first application is authorized to access said piece of requested secure data, comprising verifying that an identifier of the first application is present in a list of identifiers of applications authorized to access said piece of requested secure data, said list of identifiers being stored within said second application;
in response to the first application being authorized to access said piece of requested secure data, obtain, by said second application, said piece of requested secure data;
transmit, by said second application, said piece of requested secure data, to said first application in a transmission addressed to the first application; and
transmit, by said first application, said piece of requested secure data, to said communications network.

* * * * *